US007539078B2

(12) United States Patent
Matulik et al.

(10) Patent No.: US 7,539,078 B2
(45) Date of Patent: May 26, 2009

(54) CIRCUITS TO DELAY A SIGNAL FROM A MEMORY DEVICE

(75) Inventors: Eric Matulik, Meyreuil (FR); Alain Vergnes, Trets (FR); Frederic Schumacher, Aix En Provence (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/466,311

(22) Filed: Aug. 22, 2006

(65) Prior Publication Data

US 2009/0077409 A1      Mar. 19, 2009

(51) Int. Cl.
*G11C 8/00* (2006.01)
(52) U.S. Cl. ................................... 365/233.1
(58) Field of Classification Search ................ 365/193, 365/194, 233
See application file for complete search history.

(56) References Cited

U.S. PATENT DOCUMENTS

| 4,503,494 | A | * | 3/1985 | Hamilton et al. ............ 365/229 |
|---|---|---|---|---|
| 5,656,958 | A | | 8/1997 | Albert et al. |
| 5,703,915 | A | | 12/1997 | Vergnes et al. |
| 5,977,805 | A | | 11/1999 | Vergnes et al. |
| 6,043,694 | A | | 3/2000 | Dortu |
| 6,222,792 | B1 | | 4/2001 | Hanzawa et al. |
| 6,396,322 | B1 | | 5/2002 | Kim et al. |
| 6,417,715 | B2 | | 7/2002 | Hamamoto et al. |
| 6,480,439 | B2 | | 11/2002 | Tokutome et al. |
| 6,581,017 | B2 | | 6/2003 | Zumkehr |
| 6,646,929 | B1 | | 11/2003 | Moss et al. |
| 6,677,791 | B2 | | 1/2004 | Okuda et al. |
| 6,721,232 | B2 | | 4/2004 | Kashiwazaki |
| 6,909,315 | B2 | | 6/2005 | Carnevale et al. |
| 6,928,128 | B1 | | 8/2005 | Sidiropoulos |
| 6,930,949 | B2 | | 8/2005 | Schaefer |
| 6,940,768 | B2 | | 9/2005 | Dahlberg et al. |
| 6,944,070 | B1 | | 9/2005 | Proebsting et al. |
| 6,954,866 | B2 | | 10/2005 | Vergnes |
| 6,982,579 | B2 | | 1/2006 | Lee |
| 2004/0123207 | A1 | | 6/2004 | Zumkehr et al. |
| 2005/0027471 | A1 | | 2/2005 | Vergnes |
| 2005/0047192 | A1 | * | 3/2005 | Matsui et al. ............... 365/145 |

(Continued)

OTHER PUBLICATIONS

Physics 107 course taught at The University Of Sheffield, Originally taught Oct. 31, 2003, URL http://web.archive.org/web/20031031215632/http://www.shef.ac.uk/physics/teaching/phy107/dff.html (3 of 3)Aug. 17, 2007 8:52:01 AM.*

(Continued)

*Primary Examiner*—Richard Elms
*Assistant Examiner*—Harry W Byrne
(74) *Attorney, Agent, or Firm*—Schwegman, Lundberg & Woessner, P.A.

(57) ABSTRACT

Various apparatus and methods include a clock circuit to receive a first clock signal to generate a second clock signal having a frequency different from a frequency of the first clock signal. A clock capturing circuit receives the second clock signal for determining a number of delay elements corresponding to an amount of a period of the second clock signal. A delay calculation circuit calculates an amount of time corresponding to the number of delay elements. And a delay circuit delays an input control signal by the amount of time provided by the delay calculation circuit.

20 Claims, 8 Drawing Sheets

U.S. PATENT DOCUMENTS

| | | |
|---|---|---|
| 2005/0050375 A1 | 3/2005 | Novak et al. |
| 2005/0089060 A1 | 4/2005 | Vergnes |
| 2005/0165996 A1 | 7/2005 | Vergnes et al. |
| 2005/0219888 A1 | 10/2005 | Kwon et al. |
| 2006/0224848 A1 | 10/2006 | Matulik et al. |
| 2006/0236007 A1 | 10/2006 | Matulik et al. |

OTHER PUBLICATIONS

Ramin Farjad-Rad, et al., A Low-Power Multiplying DLL for Low-Jitter Multigigahertz Clock Generation in Highly Integrated Digital Chips, IEEE Journal of Solid-State Circuits, vol. 37, No. 12, Dec. 2002, pp. 1804-1812.*

* cited by examiner

CIRCUITS TO DELAY A SIGNAL FROM A MEMORY DEVICE

BACKGROUND OF THE INVENTION

1. Field of the Invention

The present invention relates to dual-data-rate dynamic-random-access-memory (DDR-SDRAM) devices. More particularly, the present invention relates to circuits to delay the "DQS" (data strobe) signal from a DDR-SDRAM memory device to capture data, the "DQS" signal and the data being generated simultaneously be the memory device.

2. The Prior Art

DDR-SDRAM devices can transfer data twice as fast as single-data-rate SDRAM memory devices (SDR-SDRAM). This is because DDR-SDRAM devices can send and receive signals twice per clock cycle. This feature increases the complexity of writing data to and reading data from the DDR-SDRAM device since the valid-data window is narrower than in SDR-SDRAM devices.

Referring now to FIGS. 1A and 1B, a timing diagram illustrates the valid data time windows for SDR-SDRAM devices (FIG. 1A) and DDR-SDRAM devices (FIG. 1B) with relation to the clock timing. From FIG. 1A, it may be seen that there is a single valid data window for each complete cycle of the SDR-SDRAM clock. From FIG. 1B, it may be seen that there are two valid data windows for each DDR-SDRAM clock cycle.

In an application system, for example a microcontroller circuit connected to DDR-SDRAM devices on a printed circuit board, the signal DQS is a bidirectional control signal transmitted by the DDR-SDRAM devices during read operations and by the memory controller during write operations. The memory controller may be part of a microcontroller integrated circuit. For DDR device circuitry optimization, the DQS signal is provided edge-aligned with data for read operations and should be center-aligned with data for write operations. The DQS signal and its relationship to the valid data windows of a DDR-SDRAM in a typical write operation, is shown in FIG. 2. The DQS signal and its relationship to the valid data windows of a DDR-SDRAM in a typical read operation, is shown in FIG. 3.

To write data to DDR-SDRAM devices without increasing the complexity of the DDR-SDRAM controller and to guaranty that the signal is center-aligned with data, it is possible to use the falling edge of a clock signal running at twice the frequency of the clock that drives the DDR-SDRAM devices. This aspect of operation of a DDR-SDRAM device is shown with reference to FIG. 2, in which waveforms illustrate that, for a write access from a DDR-SDRAM device, the rising and falling edges of a DDR-SDRAM DQS signal are center aligned with the valid data. The DDR SDRAM controller generates signals with such phase relationship.

As also shown in FIG. 3, if delayed with an appropriate time increment, the delayed DQS signal is aligned with the center of the valid data window, the DQS signal can be used as a sample and hold signal which makes a simple, safe circuitry to capture data from DDR-SDRAM device.

During read operation, the DQS signal is edge-aligned with data, the controller delays the DQS signal by a period of time corresponding to about ¼ of the DDR device clock period to allow alignment of the delayed DQS signal with the center of the valid data window. Under this condition, the data from the DDR device can be properly sampled because the hold/setup time margins are optimal (middle of data valid window, 321, 322, 331, 332). Of course, the delay must be stable.

A simple delay circuitry having DQS as its input and formed from a delay line of cascaded basic cell elements such as buffers or inverters does not guaranty a stable delay because basic element intrinsic delay depends on de-rating factors such as process, voltage, and temperature variations.

BRIEF DESCRIPTION OF THE INVENTION

The present invention is used to delay the DQS signal provided by DDR-SDRAM devices in order to sample DDR data. The present invention will typically operate in a DDR-SDRAM controller that interfaces with a DDR-SDRAM device. The DDR-SDRAM controller is a digital circuitry that can be found in many standard micro-controllers.

A circuit according to the present invention for delaying an input control signal, comprises a clock circuit to generate a clock signal having a frequency different from an input clock signal to delay and including a clock signal input, a derivative clock signal output, an input to program a frequency ratio between its input clock frequency and its output clock frequency. A clock capturing circuit provides a determined number of delay elements required to provide a delay of an amount of the period of the signal provided by the clock circuit. A delay calculation circuit receives the determined number of delay elements and calculates a number of delay elements needed to delay the input control signal by an amount of time. A delay circuit includes a control signal input, a select input for receiving the number of delay elements provided by the delay calculation circuit.

During read operation, the DQS signal is edge-aligned with data. According to the present invention, the controller must delay the DQS signal by a theoretical period of time corresponding to ¼ of the DDR device clock period. Due to different derating factors, the DQS and DATA signals are not 100% edge aligned in real life operations, and therefore the delay value must be adjustable around ¼ of the DDR device clock period. Under this condition, the data from the DDR device can be properly sampled because the hold/setup time margins are optimally located in the middle of the data-valid window.

The logic to delay a signal by a known stable amount of time is a delay locked loop acting as master circuitry to calculate the number of cascaded basic elements required to produce a known delay and keep it stable with respect to conditions such as process variations, voltage, and temperature. The master circuitry drives a slave delay circuit that applies the required and stable delay to the DQS signal. The master circuitry (DLL) allows determination of a stable delay (about ¼ of a clock period) regardless of the derating factors (e.g., process, voltage and temperature). The time reference entered into the master circuitry is a clock signal whose frequency is a fraction of the DDR device clock frequency (e.g., ¼, ⅓, or ⅕ of the DDR clock). The DQS and data phases relative to the DDR device clock may vary from one printed circuit board to another due to their different topologies and differences in internal circuitry topologies of the memory devices. The DQS phase may also vary due to derating factors such voltage drops.

The slave circuitry delays the DQS signal by the stable delay (about ¼ DDR clock period). Therefore the output of the slave circuitry can be used as data sampling command. The DLL circuitry determines the number of basic elements such as buffers or inverters to be cascaded to delay the DQS signal by a given amount of time (about ¼ of the DDR clock). The number of delay elements may be modified/adjusted on the fly to obtain a stable delay.

The present invention avoids the use of circuitry containing analog cells which are touchy in terms of noise, foundry testability, consumption, and portability over different technologies.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons.

Figure 1A:
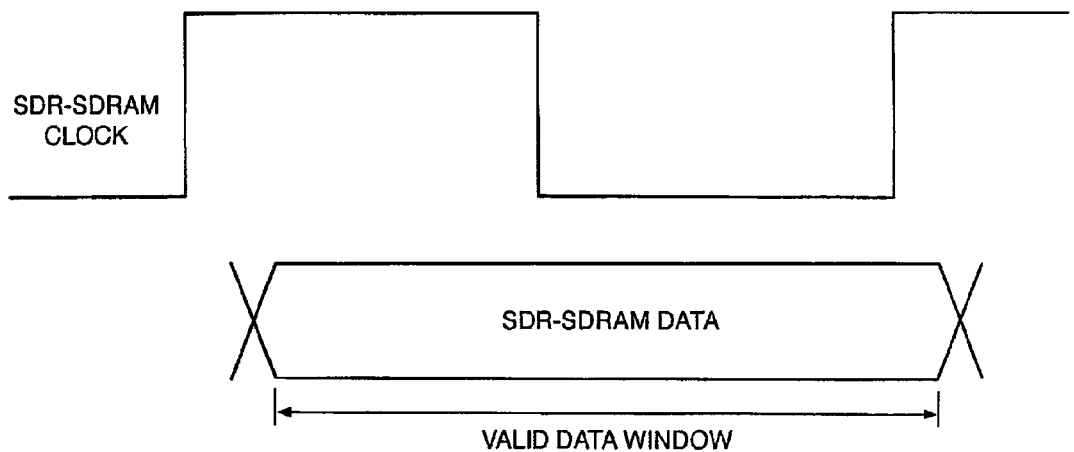
FIGS. 1A and 1B are timing diagrams illustrating the valid data window of SDR-DRAM and DDR-DRAM devices.
Figure 1B:
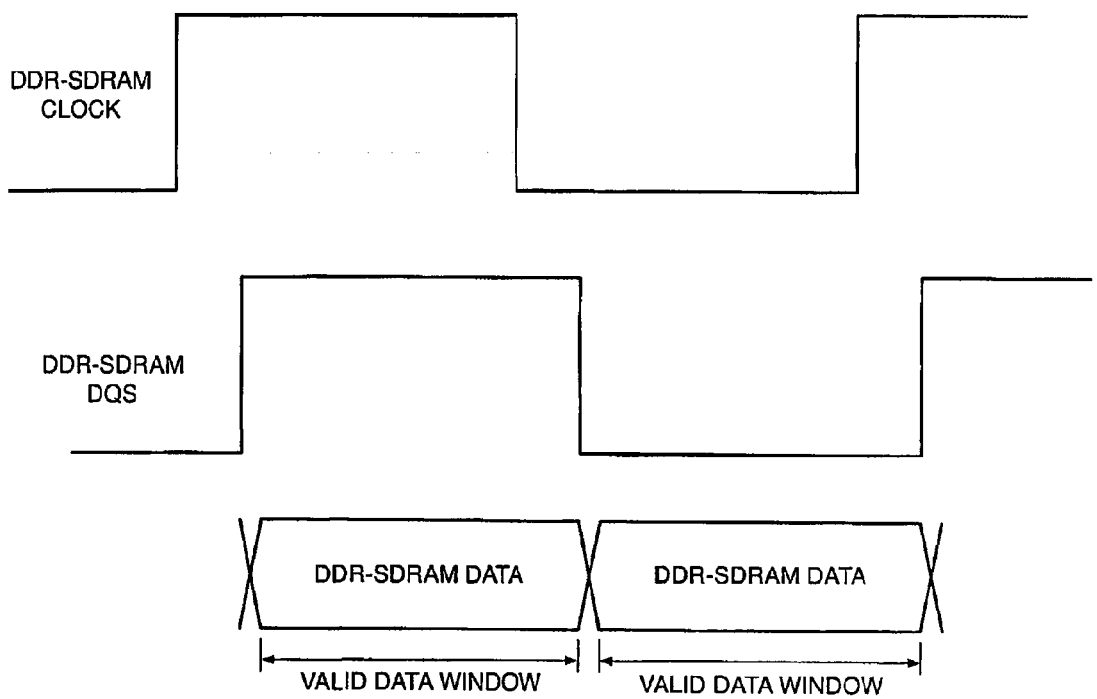
Figure 2:
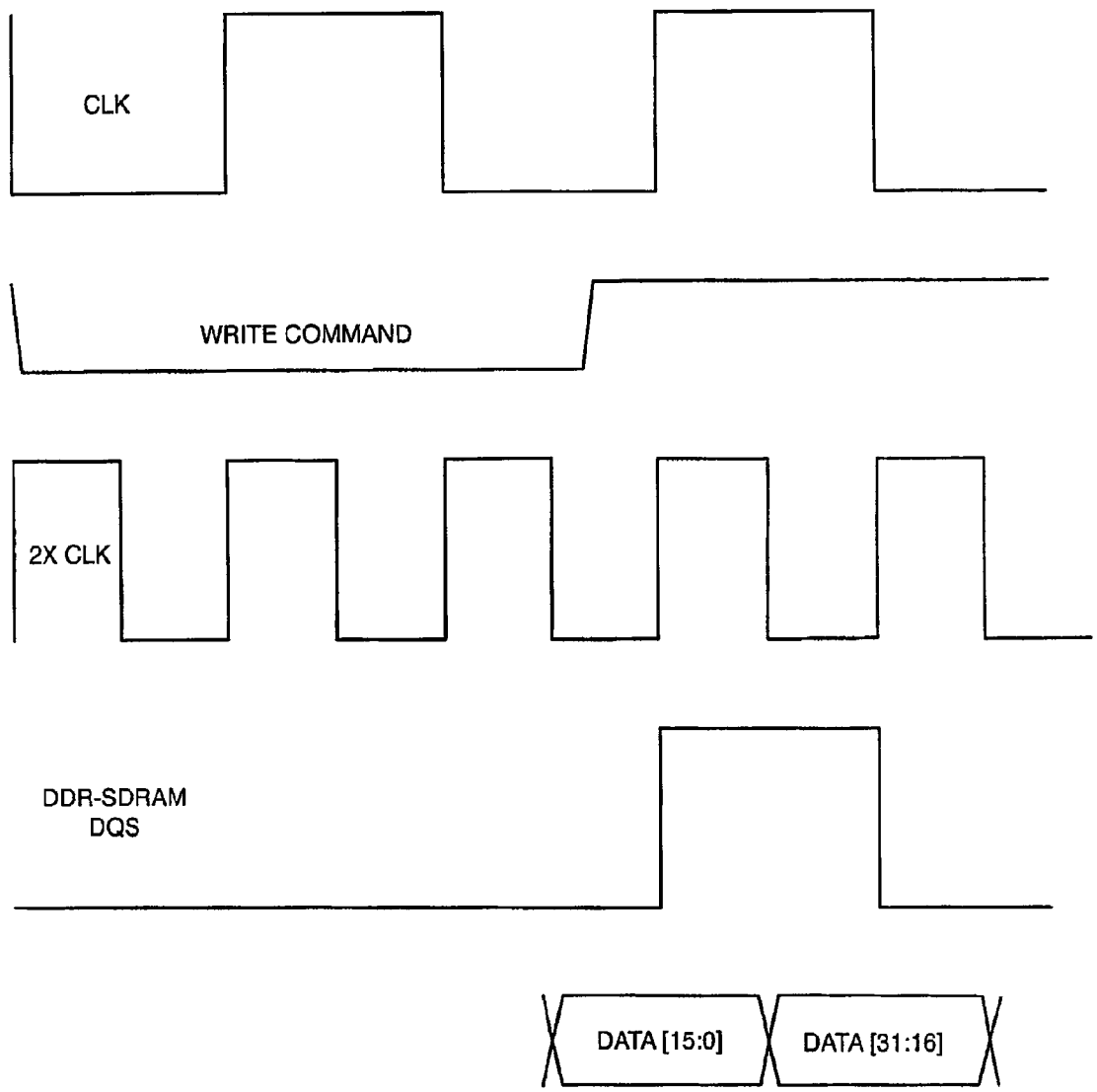
FIG. 2 is a timing diagram illustrating a typical DDR-SDRAM write access.
Figure 3:
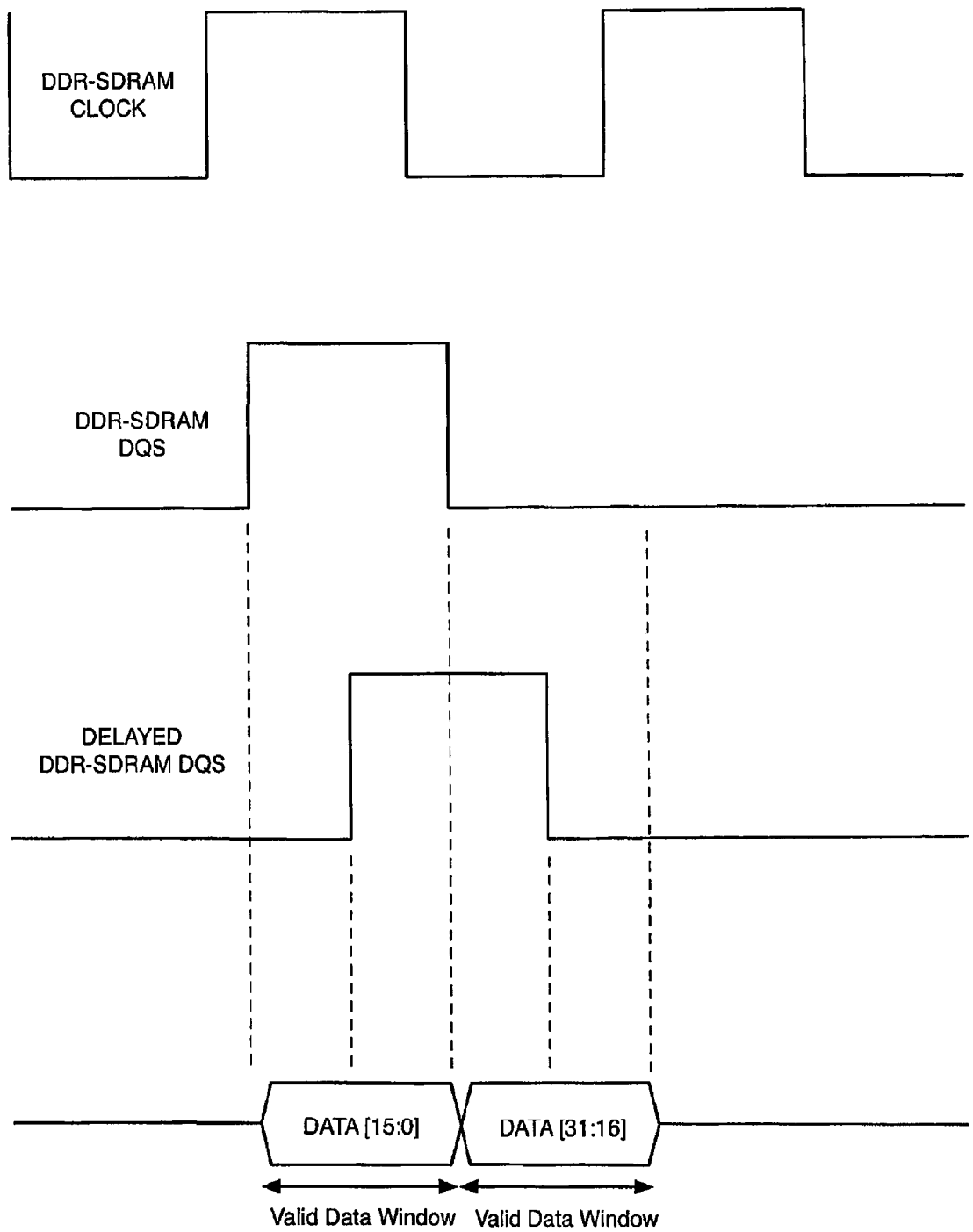
FIG. 3 is a timing diagram illustrating a typical DDR-SDRAM read access.
Figure 4:
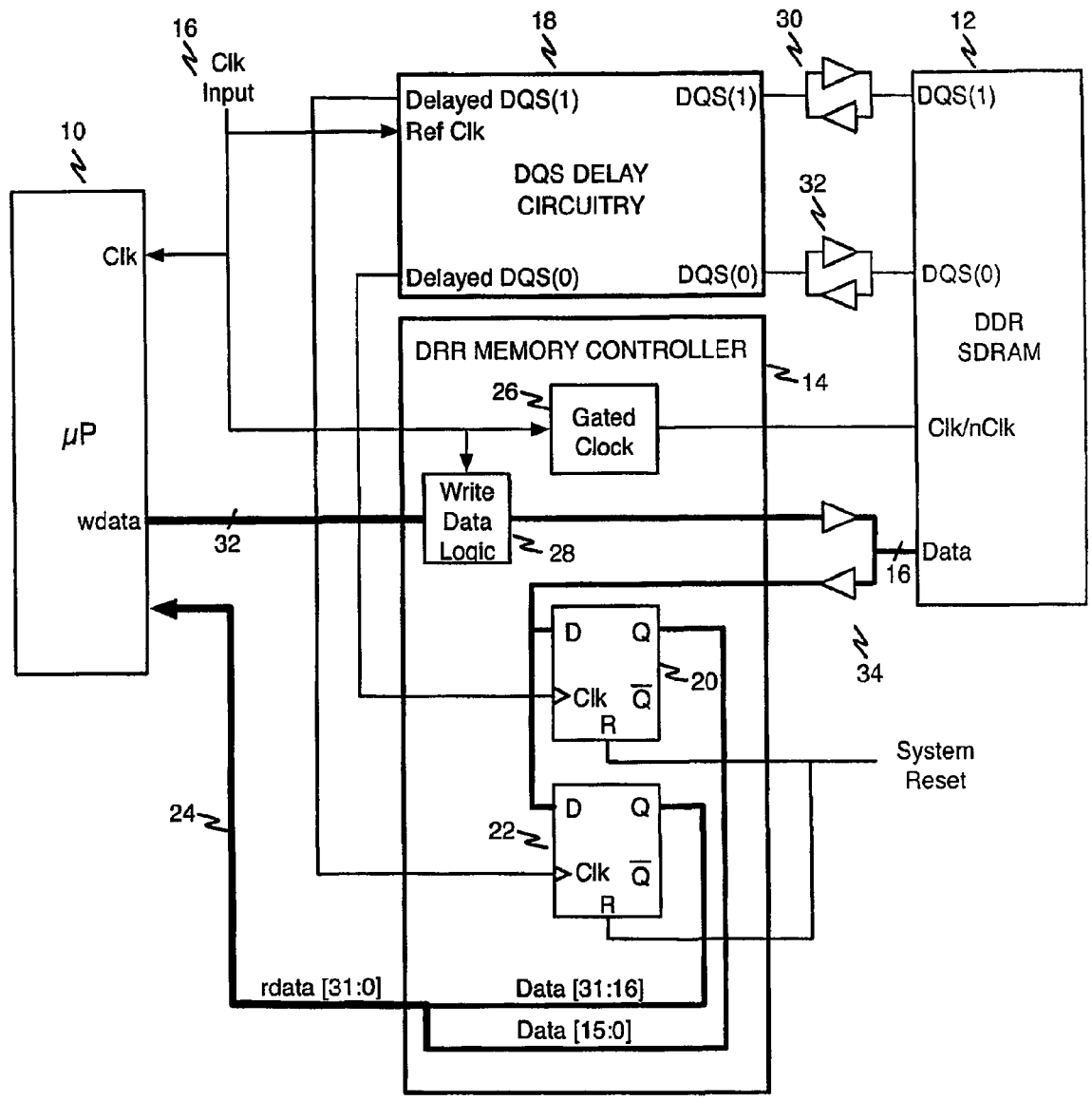
FIG. 4 is a diagram illustrating a typical application environment in which a microcontroller is shown driving a DDR-SDRAM device.

Referring now to FIG. 4, a block diagram illustrates a typical environment in which the present invention may be employed. FIG. 4 shows a system including a microcontroller 10 connected to a DDR-SDRAM device 12 through a DDR memory controller 14. An input clock signal, shown at reference numeral 16, provides a clock reference signal to DQS delay circuitry 18. The function of DQS delay circuitry 18 is to delay the DQS(0) and DQS(1) signals from DDR-SDRAM device 12 to produce a delayed DQS(0) and a delayed DQS(1) signal to control reading data from DDR-SDRAM device 12. It is to a DQS delay circuitry 18 that the present invention is directed.

As may be seen from an examination of FIG. 4, the delayed DQS(0) and delayed DQS(1) signals are used to clock D-flip-flops 20 and 22, respectively. D-flip-flops 20 and 22 are used to latch the lower-order and upper-order data bits read from DDR-SDRAM device 12 and presented to microprocessor 10 on rdata bus 24. In addition, gated clock 26 and write-data logic 28 in DDR memory controller 14 generate the signals necessary to write data from microprocessor 10 into DDR-SDRAM device 12. As will be appreciated by persons of ordinary skill in the art, bi-directional buffers 30 and 32 are interposed between DDR-SDRAM device 12 and DQS delay circuitry 18 and bi-directional buffer 34 is interposed between DDR-SDRAM device 12 and DDR memory controller 14. These buffers are controlled as known in the art to pass data in the proper direction for read and write operations by conventional circuitry (not shown).

To make the DQS signal delay stable, a programmable delay line must be used and tuned with regard to variations in the derating factor. This tuning will be automatically performed by a locked loop circuit. Therefore a programmable delay line more complex than a simple delay line is used in the present invention. Such a programmable delay line employs a programmable number of basic delay units as will be disclosed herein. Independent master circuitry is used to keep track of the derating variations to select, in real-time, the number of basic delay elements used in the programmable delay line to provide a given delay for the DQS signal input.

The respective DQS and data phases may also vary from one printed circuit board to another due to different printed circuit board topologies and different internal circuit topologies of memory devices, resulting in the necessity to tune the delay applied to the DQS signal. The phase of the DQS signal may also vary due to de-rating factors such internal or external voltage drops. This kind of tuning, used to modify the delay amount, is totally different from automatic tuning of the master locked circuitry. The tuning performed by the present invention provides the capability to adjust a delay around the theoretical value of ¼ of the clock period Independent master circuitry is provided with a stable delay reference and locks on to the stable delay reference using a number of basic delay cells identical to the programmable delay line used to delay the DQS signal input. The locked system ensures tracking variations in the derating factor.

The stable time reference entered into the master circuitry is the clock signal of the DDR-SDRAM memory controller or a clock signal having a frequency which is a sub-multiple (divided by 2, etc.) of the frequency of the memory controller to make the DQS delay circuitry more simple to design and to make the reference entered into the master circuitry more predictable especially when duty-cycle of the DDR-SDRAM controller may not be stable or different from a known value such as 50%.

The slave circuitry receives the DQS signal as input and delays it by the stable delay (about ¼ DDR clock period, subject to fine tuning to match DQS and data phase variations). Therefore the output of the slave circuitry driven by the master circuitry can be used as data sampling command.

Figure 5:
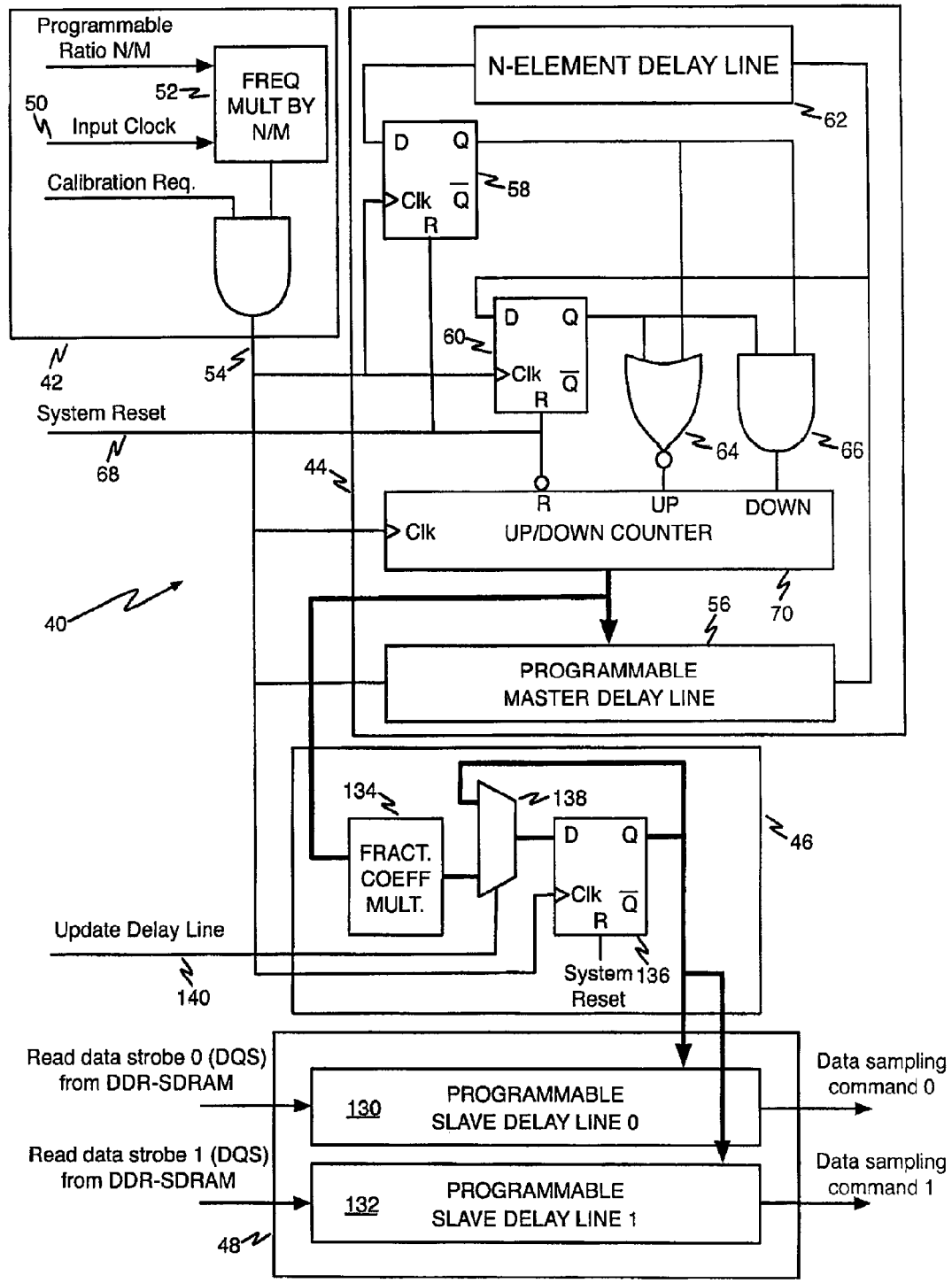
FIG. 5 is a block diagram illustrating a circuit according to the present invention for producing a DQS signal having a programmable delay.

Referring now to FIG. 5, a simplified schematic diagram shows an illustrative example of DQS Delay circuitry 40 that provides the aforementioned features according to the present invention. A simplified schematic includes blocks 42, 44, 46, and 48. The reference delay will be provided by block 42, then master locked loop circuitry 44 will determine the number of basic delay elements to cascade to obtain the reference delay. This number of delay elements will be converted in block 46 to get the final number of basic delay elements to delay the DQS signals by means of slave delay lines 48.

Block 42 allows obtaining a programmable reference delay by employing circuitry that multiplies the input frequency on line 50 by the programmable ratio N/M in multiplier 52, whose output has a frequency value equal to $[(N/M)*F_{input}]$, where $f_{input}$ is the input frequency on line 50. The output of block 42 is the system clock of the DQS delay circuitry 40 and will act as a reference signal delay.

This programmable value allows modification of the optimal data sampling point. The theoretical value of the optimal data sampling point is ¼ of the DDR-SDRAM clock period, but due to different printed circuit boards on which data and DQS signals are routed with different wire lengths and/or capacitances, plus differences in the internal circuits of the memory devices, the terminal points of these signals may be differently phased. Therefore, the optimal sampling point will be nominally about ¼ of the clock period but may end up to be a little bit more or less. As these conditions can vary from one printed circuit board to another, it is important to provide the capability to tune the sampling point through the user interface of the DDR-SDRAM controller.

Different methods exist to generate a programmable delay, and the module 40 of FIG. 5 is one example. The fractional coefficient multiplier can use a phase-locked loop (PLL) and two simple clock dividers to get a fractional divider as will be shown with reference to FIG. 6.

For the descriptions of next modules, it is assumed that module 42 provides an output clock period on signal line 54 being twice the input clock period provided to the DDR-SDRAM device (i.e. if the DDR-SDRAM is clocked at 100 MHz, the frequency at signal line 54 is 50 MHz).

Block 44 contains the circuitry that locks on the reference delay provided by module 42. It allows determination of the number of basic delay elements of a delay line 56 to obtain a delay which is a fraction of the system clock period.

The number of delay elements determined by block 44 will be a known fraction of the number of elements required to delay the DQS signal from DDR-SDRAM devices. The delay line used in module 44 is designed with the same basic delay elements as the one that will be used in the slave delay line to delay the DQS signal.

In the following example, the module 44 is designed in such a way that it locks on half of a system clock period. This leads to a simplified circuit architecture to reach the lock state from initial or reset state or from lock to lock state (due to a derating factor variation).

As in all locked systems, the architecture comprises a phase detector circuit to provide the information necessary to add or remove basic delay elements in the programmable delay line 56 to match the reference delay provided by stable clock signal 54.

In the example shown in FIG. 5, the phase detector circuit includes D-flip-flops 58 and 60, delay line elements 62 including a limited number of basic delay elements such as buffers or an even number of inverters, a NOR gate 64 and an AND gate 66. The circuit is driven by clock input 54, and uses the output of delay line 62 and the output of the programmable delay line 56 as a feedback clock.

When system reset is asserted on line 68, the D-flip-flops 58 and 60 are cleared, the programmable master delay line provides a feedback clock at the output of master programmable delay line 56 delayed by a single basic delay element because the up/down counter 70 is set accordingly from the outputs of NOR gate 64 and an AND gate 66.

Figure 8A:
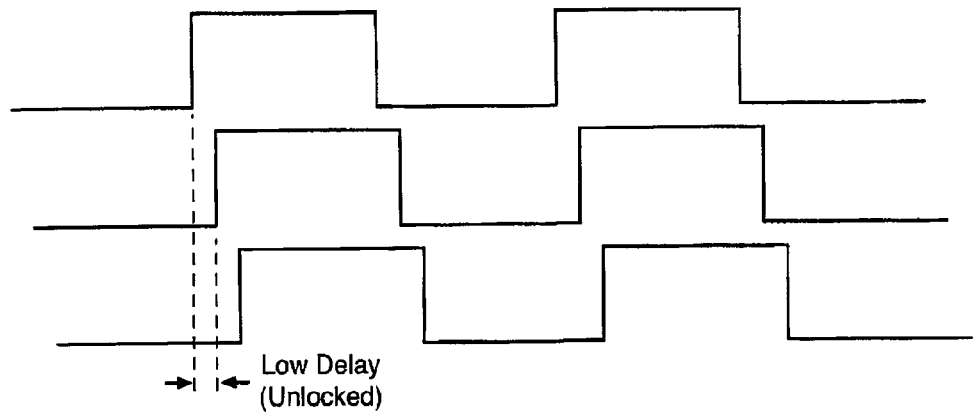
FIGS. 8A through 8C are timing diagrams showing the locked and two unlocked conditions for the circuit of FIG. 5.

After de-assertion of system reset on line 68, the D-flip-flops 58 and 60 start sampling logical "0" (the low portion of the waveform at the output of master programmable delay line 56). When the outputs of both D-flip-flops are cleared, the 2-input NOR gate 64 provides a logical 1 at the "UP" input of up/down counter 70 to indicate that the phase detector 44 is unlocked and requires more basic delay elements to be included in the master programmable delay line to reach the lock state. The 2-input AND gate 66 drives the "DOWN" input of the up/down counter 70 with a logical "0" to indicate that there is no need to remove delay elements in the programmable delay line 56. An example of this state is shown in FIG. 8A.

The up/down counter 70 modifies its output to instruct master programmable delay line 56 to add more delay. The programmable delay line increases its internal delay accordingly by selecting 1 more basic delay. The phase detector module 44 is still in its unlocked state.

Figure 8B:
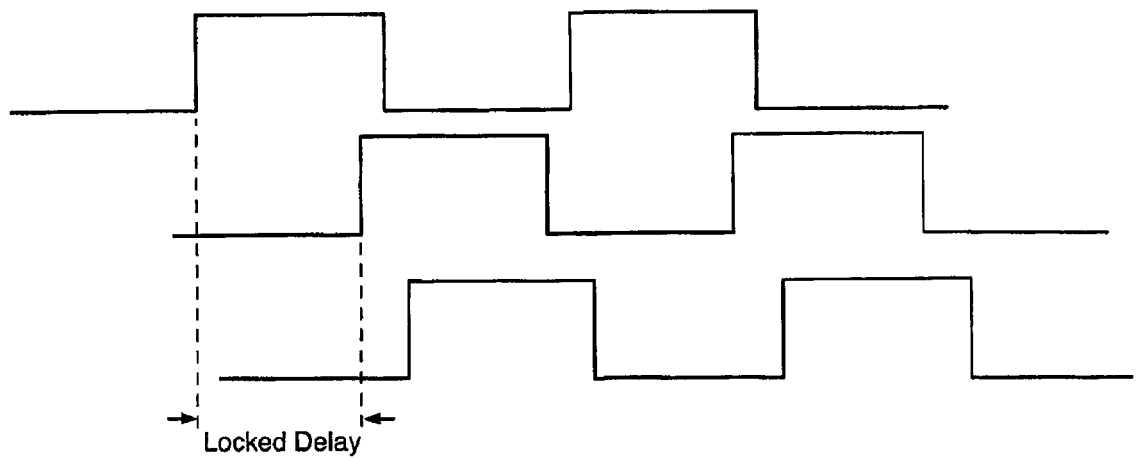
Figure 8C:
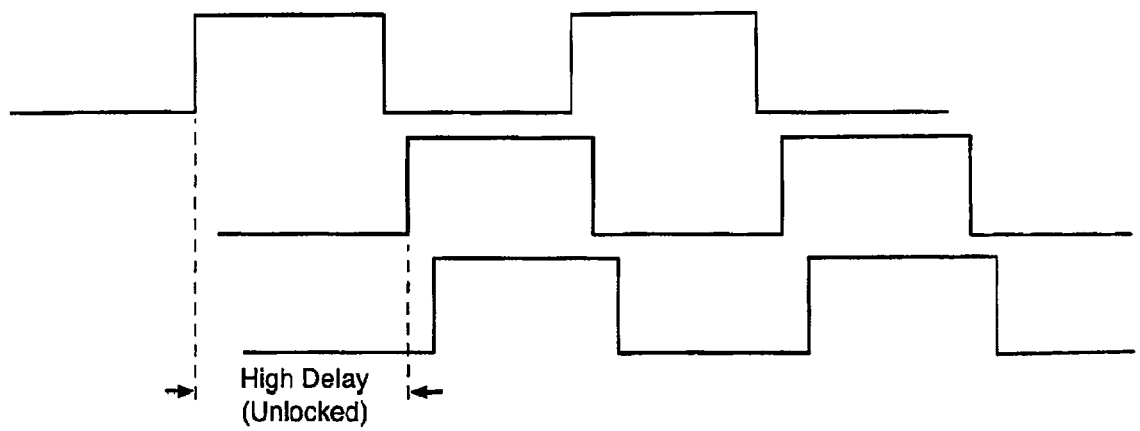

If the delay becomes greater than the reference delay provided by the clock period of system clock at its output 54, both D-flip-flops 58 and 60 sample a logical "1." The 2-inputs NOR gate 64 returns logical "0" to the "UP" input of up/down counter 70 and the 2-input AND gate 66 provides a logical "1" to the "DOWN" input of up/down counter 70. Under these conditions, up/down counter 70 modifies the value provided on its output to instruct the master programmable delay line 56 to remove one basic delay element. The master programmable delay line decreases its internal delay accordingly. The phase detector 44 is still in its unlocked phase. An example of this state is shown in FIG. 8C.

When the programmable delay line 56 delays the system clock on signal line 54 by half the system clock period (locked state), D-flip-flop 58 samples a logical "1" whereas D-flip-flop 60 samples a logical "0." This difference of sampled values is possible due to the presence of delay line 62 in the path of the data input of D-flip-flop 58.

Delay line 62 allows locating the falling edge of the delayed feedback clock at the output of delay line 62 to a time after the rising edge of system clock on line 54 and locating the falling edge of the feedback clock prior to the rising edge of the system clock on line 54. In this case both NOR gate 64 and AND gate 66 provide logical "0" to the "UP" and "DOWN" inputs of up/down counter 70. The output of up/down counter 70 does not change, indicating that the phase error provided by the phase detector is zero and the phase detector 44 is locked. An example of this state is shown in FIG. 8B.

The delay line 62 can be designed with basic delay elements such classical inverters or buffers. There is no need for more complex delay elements as will be disclosed with reference to the master programmable delay line 56.

The propagation delay between the input of delay line 62 and its output must be greater than a value defined as the sum of the setup and hold time of the D-flip-flops 58 and 60. This will limit the metastable behavior on both D-flip-flops for each sampling point. If one of the delayed signals to the data inputs of D-flip-flops 58 and 60 arrives in the metastable period of one D-flip-flop, then the other signal cannot be in the metastable period of the second one.

Persons of ordinary skill in the art will appreciate that there is still a probability of one of the D-flip-flops sampling data in a setup or hold period. There is no way to avoid this situation but an improvement exists in the definition of the intrinsic delay value (in delay line 62) of phase detector 44.

If the propagation delay of phase detector 44 is greater than the higher value of the metastable period among D-flip-flops 58 and 60 plus the minimum delay in the programmable delay line 62, the phase detector will stay in a locked state without metastable behavior of D-flip-flops 58 and 60. Metastable states will occur in transient phases.

In its locked state, the phase detector 44 defines a number of basic delay elements needed to delay the system clock by half the system clock period. A main objective of the present invention is to get ¼ of the DQS period or ¼ of the DDR-SDRAM device clock period. Therefore a conversion must be performed and applied to programmable delay line connected to DQS control input signals.

Figure 6:
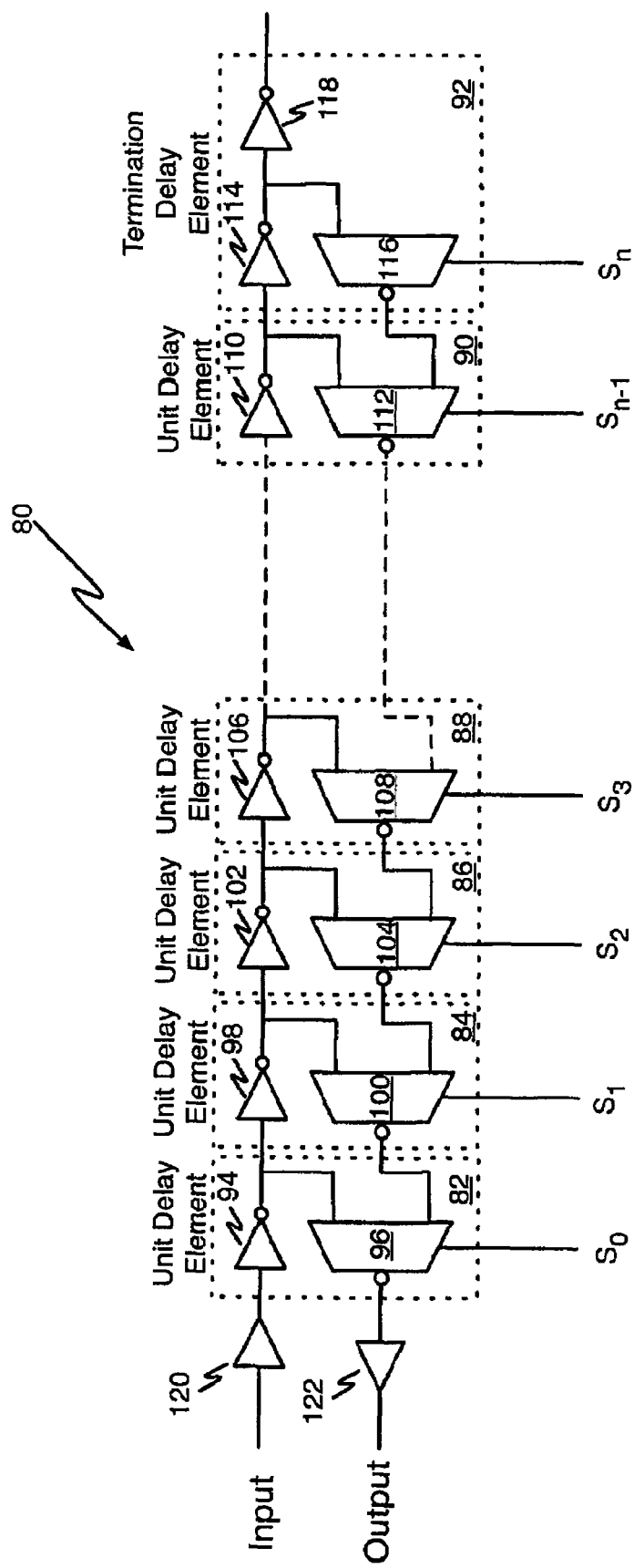
FIG. 6 is a diagram illustrating a typical programmable delay line suitable for use in the present invention.

Referring now to FIG. 6, an illustrative programmable delay line circuit 80 to use as a programmable delay line such as master programmable delay line 56 in FIG. 5 is shown. The illustrative programmable delay line circuit 80 in FIG. 6 is shown having a plurality of cascaded unit delay elements 82, 84, 86, 88, 90, and 92. Each unit delay element includes an inverter and a multiplexer. The inverter of each unit delay element being cascaded with the inverter of the next unit delay element and the multiplexer of each unit delay element has one input cascaded with the inverter of the previous unit delay element. Thus unit delay element 82 includes inverter 94 and multiplexer 96; unit delay element 84 includes inverter 98 and multiplexer 100; unit delay element 86 includes inverter 102 and multiplexer 104; unit delay element 88 includes inverter 106 and multiplexer 108; unit delay element 90 includes inverter 110 and multiplexer 112; unit delay element 92 includes inverter 114 and multiplexer 116. The purpose of inverter 118 is to balance the capacitive load for each stage of the programmable delay line and therefore balance the propagation delay of each stage. An input buffer 120 and an output buffer 122 are provided to provide a correct input edge and provide a load-independent output.

Multiplexers 96, 100, 104, 108, 112, and 116 are controlled by select inputs $S_0$, $S_1$, $S_2$, $S_3$, ... $S_{(n-1)}$ and $S_{(n)}$, respectively. If the select input of a unit delay element is set to logic zero, its multiplexer selects the inverted output of the multiplexer in the next unit delay element. If the select input of a unit delay element is set to logic one, its multiplexer selects the output of its own inverter. Thus, only one select input in the programmable delay line circuit 80 need be set to logic one, in which unit delay element the signal is turned around and is directed back down through the chain of multiplexers and ultimately to the output buffer 122. Any select inputs further downstream in the chain that are set to logic one do not affect the operation of the programmable delay line circuit 80.

As an example, if the select input $S_0$ and $S_1$ are set to logic zero and the select input $S_2$ is set to logic one, the signal will pass through the input buffer 120, inverters 94, 98 and 102, multiplexers 104, 100 and 96, and through output buffer 122. The states of select inputs $S_3$, ... $S_{(n-1)}$ and $S_{(n)}$ will not affect the operation of the circuit.

Referring again to FIG. 5, block 46 functions to convert the data from the output of up/down counter 70 to a value that may be used by the slave programmable delay line circuits 130 and 132 in block 48 of the circuit of FIG. 5. Slave programmable delay line circuits 130 and 132 may also be configured as shown in FIG. 6. Module 46 in the circuit of FIG. 5 performs a converter function and allows to modification of the slave programmable delay lines 130 and 132 at appropriate locations during operation. The Delay Locked Loop comprising phase detector 44 is locked on half the clock period (i.e. the programmable delay line 56 delays the input clock signal on line 54 by half the clock period). Thus, using an identical slave programmable delay line to delay the DQS input control signal by ¼ of the clock period provided to the DDR-SDRAM device, the number of basic delay elements to select is ¼ of the value reported by up/down Counter 70 because the lock is performed on the half period of a clock which is divided by 2 versus the clock provided to the DDR-SDRAM memory.

Block 46 includes a fractional coefficient multiplier 134, whose input may be updated as necessary by the output of up/down counter 70. Its output is presented to D-flip-flop 136 via multiplexer 138. The data latched in D-flip-flop 136 is used to drive slave programmable delay lines 130 and 132 of block 48. The select input of multiplexer 138 is driven by the update delay line signal at line 140. As long as the update signal is not asserted, the output of D-flip-flop 136 is fed back to its data input through multiplexer 138. When the update signal 140 is asserted, the input of D-flip-flop 136 is driven by the output of up/down counter 70.

Due to the structure of the programmable delay line 56 as has been shown and described with reference to FIG. 6, the input value to supply to the switching inputs of the multiplexers in the delay line to select the delay amount is not a decimal coded value but rather a one-hot value. Therefore to divide the input value by 4, fractional coefficient multiplier 134 may be configured as a look-up table. The functionality of fractional coefficient multiplier 134 can be seen as a fractional coefficient multiplier on a non-decimal base. Table 1 shows an example of look-up table embedded in fractional coefficient multiplier 134.

TABLE 1

| Input Value | Number of selected basic elements in Master Delay Line | Output Value | Number of selected basic elements in Slave Delay Line |
|---|---|---|---|
| 1000000000000000 | 1 | 1000000000000000 | 1 |
| 0100000000000000 | 2 | 1000000000000000 | 1 |
| 0010000000000000 | 3 | 1000000000000000 | 1 |
| 0001000000000000 | 4 | 1000000000000000 | 1 |
| 0000100000000000 | 5 | 1000000000000000 | 1 |
| 0000010000000000 | 6 | 0100000000000000 | 2 |
| 0000001000000000 | 7 | 0100000000000000 | 2 |
| 0000000100000000 | 8 | 0100000000000000 | 2 |
| 0000000000000001 | 16 | 0001000000000000 | 4 |

Care must be taken when changing the delay value. The value returned by fractional coefficient multiplier 134 cannot be applied to the slave programmable delay line at any time. It is preferable to apply a new value when there is no access being made to data from the DDR-SDRAM device. If this value is altered when the memory device is being accessed, the value must be held to avoid modifying the DQS delay when the DQS signal is in use to avoid the risk of a parasitic pulse when switching from one delay to another one in the programmable delay line. At any rate, if accesses are performed without interruption, there is a need to update the delay to take into account the possible derating factor variations. The DDR-SDRAM devices need to periodically interrupt the accesses to be able to refresh their contents. The times of these refresh cycles are known by the memory controller. This information can be used to safely enable the update of the slave delay line during refresh operations when the DQS signals are not used by the DDR-SDRAM memory controller and glitches on that line will not matter.

If such a scheme is used, when the memory controller (not shown) instructs the DDR-SDRAM device to perform refresh, it asserts a signal on line 140, thereby refreshing the contents of D-flip-flop 136. As soon as refresh period is finished, the line 140 is de-asserted and the multiplexer 138 re-circulates data to D-flip-flop 136.

Figure 7:
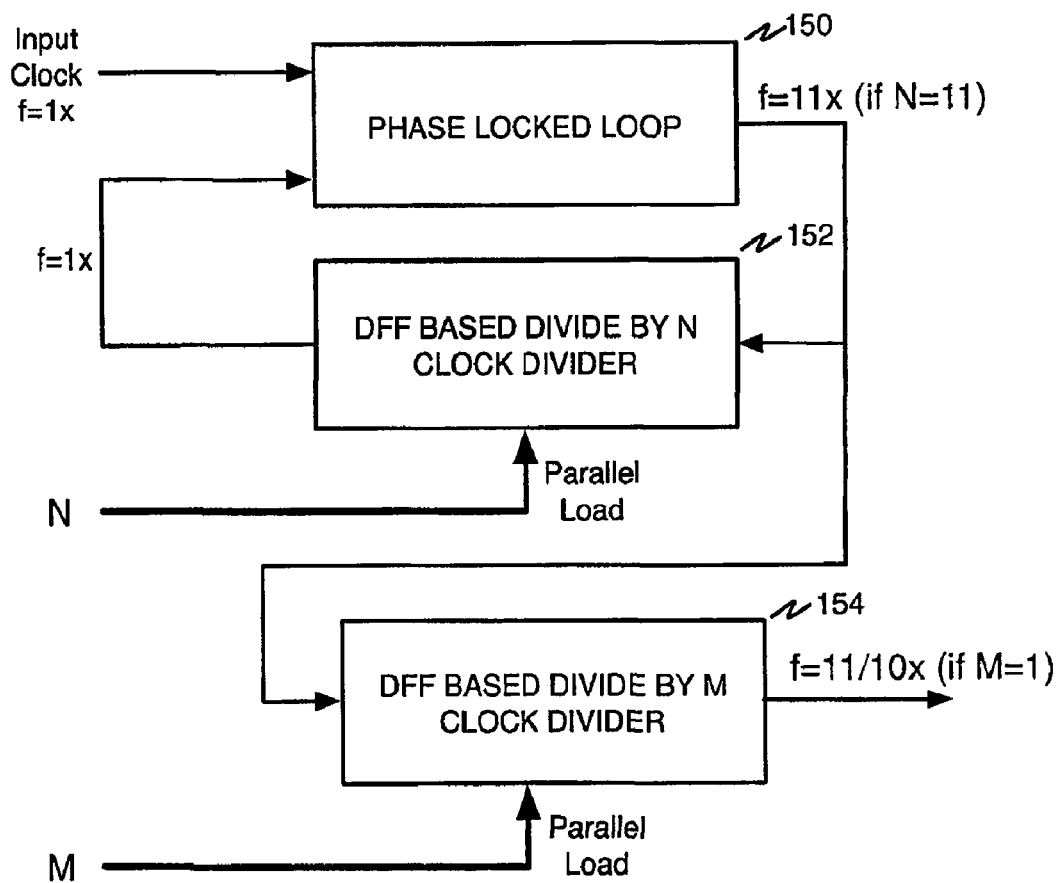
FIG. 7 is a diagram illustrating a N/M multiplier circuit that is suitable for use in the present invention.

Referring now to FIG. 7, an illustrative circuit for multiplier 52 of FIG. 5 is shown. A N/M multiplier may be formed from a PLL 150 and two clock dividers 152 and 154. As an example, the PLL 150 can multiply the input signal by 8, 9, 10, 11, or 12 and the divide the resulting frequency by 10. The range of frequency on clock line 54 will be within +/−20% of the initial frequency. As a consequence, the delay locked loop module 42 will lock on a different reference delay and the user will have the ability to modify the delay of the DQS signal. The fractional coefficient multiplier can be a single value and, in such a case, the design is simpler than a PLL. It can be a simple divider by two (DFF with negated output connected on its data input).

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus comprising:
    a clock circuit to receive a first clock signal having a first frequency for generating a second clock signal based on the first clock signal and having a second frequency different from the first frequency;
    a clock capturing circuit to receive the second clock signal for determining a number of delay elements corresponding to an amount of a period of the second clock signal;
    a delay calculation circuit coupled to the clock capturing circuit to calculate an amount of time corresponding to the number of delay elements; and
    a delay circuit to delay an input control signal by the amount of time provided by the delay calculation circuit, the input control signal having a frequency higher than the second frequency.

2. The apparatus of claim 1, wherein the clock capturing circuit is configured to lock on half of the period of the second clock signal.

3. The apparatus of claim 1, wherein the clock circuit includes a Phase Locked Loop circuit to provide a multiplier and a divider to cause the second frequency to be different from the first frequency.

4. The apparatus of claim 1, wherein the clock circuit includes a Delay Locked Loop circuit and associative logic to provide a multiplier and a divider to cause the second frequency to be different from the first frequency.

5. The apparatus of claim 3, wherein the multiplier is two and the divider is three.

6. The apparatus of claim 3, wherein the multiplier is set to one and the divider is programmable among decimal values two and one.

7. The apparatus of claim 1, wherein the input control signal is received from a memory device and the number of delay elements is updated during a period of inactivity of the memory device.

8. The apparatus of claim 7, wherein the period of inactivity of the memory device occurs during a refresh period of the memory device.

9. The apparatus of claim 1, wherein the input control signal includes a read data strobe received from a double data rate synchronous dynamic random access (DDR-SDRAM) memory.

10. The apparatus of claim 1, wherein the clock capturing circuit is configured to calculate a number of unit delay elements to be cascaded to obtain a period equal to half of the clock period of the second clock signal.

11. The apparatus of claim 1, wherein the clock capturing circuit includes two D-flip-flop cells clocked on the second clock signal, and wherein the two D-flip-flop cells are arranged such that a delay amount inserted between two data inputs of the two D-flip-flop cells is greater than a setup time plus a hold time of the two D-flip-flop cells plus one unit delay of a programmable delay line of the clock capturing circuit.

12. The apparatus of claim 1, wherein the clock circuit includes a node to receive a programmable signal to switch off the clock circuit.

13. The apparatus of claim 1, wherein the clock circuit is configured to multiply the first frequency by a first number to provide a resulting frequency and configured to divide the resulting frequency by a second number to provide the second frequency.

14. The apparatus of claim 1 further comprising a microcontroller integrated circuit.

15. An apparatus comprising:
    a clock circuit to receive a first clock signal having a first frequency for generating a second clock signal based on the first clock signal and having a second frequency equal to a fixed fractional ratio of the first frequency;
    a clock capturing circuit to receive the second clock signal for determining a number of delay elements corresponding to an amount of a period of the second clock signal;
    a delay calculation circuit coupled to the clock capturing circuit to calculate an amount of time corresponding to the number of delay elements; and
    a delay circuit to delay an input control signal by the amount of time provided by the delay calculation circuit, the input control signal having a frequency of about two times the second frequency.

16. The apparatus of claim 15, wherein the fixed fractional ratio is ½.

17. The apparatus of claim 15, wherein the clock circuit includes a divider circuit having flip flops configured to provide the fixed fractional ratio.

18. The apparatus of claim 17, wherein the divider circuit is configured to cancel falling-edge jitter of the first clock signal.

19. The apparatus of claim 15, wherein the clock circuit is configured to multiply the first frequency by a first number to provide a resulting frequency and configured to divide the resulting frequency by a second number to provide the second frequency.

20. The apparatus of claim 15 is disposed on an integrated circuit with a microcontroller.

* * * * *

UNITED STATES PATENT AND TRADEMARK OFFICE
CERTIFICATE OF CORRECTION

PATENT NO. : 7,539,078 B2 Page 1 of 1
APPLICATION NO. : 11/466311
DATED : May 26, 2009
INVENTOR(S) : Matulik et al.

It is certified that error appears in the above-identified patent and that said Letters Patent is hereby corrected as shown below:

In column 1, line 12, delete "be" and insert -- by --, therefor.

In column 4, line 17, after "period" insert -- . --.

Signed and Sealed this

Twenty-eighth Day of July, 2009

JOHN DOLL
*Acting Director of the United States Patent and Trademark Office*